United States Patent
Lysen

(10) Patent No.: US 10,365,093 B2
(45) Date of Patent: Jul. 30, 2019

(54) SYSTEM AND METHOD FOR DETERMINING THE DISPLACEMENT OF TWO BODIES RELATIVE TO EACH OTHER

(71) Applicant: Prüftechnik Dieter Busch AG, Ismaning (DE)

(72) Inventor: Heinrich Lysen, Garching (DE)

(73) Assignee: Prüftechnik Dieter Busch AG, Ismaning (DE)

( * ) Notice: Subject to any disclaimer, the term of this patent is extended or adjusted under 35 U.S.C. 154(b) by 169 days.

(21) Appl. No.: 15/561,773

(22) PCT Filed: Mar. 10, 2016

(86) PCT No.: PCT/DE2016/200131
§ 371 (c)(1),
(2) Date: Sep. 26, 2017

(87) PCT Pub. No.: WO2016/155720
PCT Pub. Date: Oct. 6, 2016

(65) Prior Publication Data
US 2018/0080764 A1  Mar. 22, 2018

(30) Foreign Application Priority Data

Mar. 31, 2015 (DE) .......... 10 2015 205 830

(51) Int. Cl.
*G01B 11/27* (2006.01)
*G01B 5/25* (2006.01)
*G01B 11/00* (2006.01)
*G01B 11/26* (2006.01)
*G01B 11/14* (2006.01)

(52) U.S. Cl.
CPC .............. *G01B 11/272* (2013.01); *G01B 5/25* (2013.01); *G01B 11/002* (2013.01); *G01B 11/26* (2013.01); *G01B 11/14* (2013.01)

(58) Field of Classification Search
CPC ..... G01B 11/272; G01B 11/002; G01B 11/26; G01B 11/14; G01B 5/25
See application file for complete search history.

(56) References Cited

U.S. PATENT DOCUMENTS

| 2,347,702 A | 5/1944 | Maris |
| 4,451,992 A | 6/1984 | Malak |
| 4,518,855 A | 5/1985 | Malak |
| 8,533,965 B2 | 9/2013 | Strömberg |
| 2002/0152622 A1 | 10/2002 | Granger |
| 2011/0113888 A1 | 5/2011 | Busch et al. |
| 2014/0022543 A1 | 1/2014 | Lysen |

FOREIGN PATENT DOCUMENTS

| DE | 3335336 A1 | 4/1984 |
| DE | 3814466 A1 | 11/1989 |
| DE | 29713805 U1 | 3/1998 |
| DE | 102013210736 A1 | 12/2014 |
| WO | 2010042039 A1 | 4/2010 |

*Primary Examiner* — Eric L Bolda
(74) *Attorney, Agent, or Firm* — Barlow, Josephs & Holmes, Ltd.

(57) ABSTRACT

The invention relates to a system and to a method for determining the displacement of two bodies relative to each other, wherein the system comprises a first camera, a second camera, a first lamp, and a second lamp, wherein both the first camera and the second camera comprise an objective and an image sensor having a sensor surface.

12 Claims, 2 Drawing Sheets

SYSTEM AND METHOD FOR DETERMINING THE DISPLACEMENT OF TWO BODIES RELATIVE TO EACH OTHER

BACKGROUND OF THE INVENTION

The present invention relates to a system and a method for determining the displacement of two bodies relative to each other.

A system and a method of the type mentioned at the outset are known, for example, from WO 2010/042039 A1. In the known system, a geometrical pattern attached to a first rotatable body is detected by a detector unit, which is attached to a second rotatable body, in multiple rotational positions of the first body and/or second body. Furthermore, a further geometrical pattern attached to the second rotatable body is also detected by a further detector unit attached to the first rotatable body in these rotational positions. In the technical teaching known from WO 2010/042039 A1, the location of the rotational axis of the first rotatable body relative to the rotational axis of the second rotatable body is then determined on the basis of the shifts of the detected geometrical patterns accompanying the change of the rotational positions, wherein the two units or bodies can in particular be shafts to be aligned flush with one another. Each of the detector units has a camera for detecting the geometrical pattern. For the accurate determination of the location of the rotational axes relative to each other, in the known solution, the patterns are to be imaged as precisely and/or sharply as possible on the sensor surface of the image sensor of the respective camera. For this purpose, the cameras have to be focused as precisely as possible on the geometric pattern. The setting of a desired focus has proven to be complex and susceptible to error in practice, since even minor acceleration and gravitational forces as can occur, for example, during the turning of the detector units, can be accompanied by an undesired displacement of the objective lens, which in turn results in inaccuracies in the determination of the location of the rotational axes relative to one another. Such difficulties with the focusing also result, for example, in the solution known from DE 33 35 336 A1. A method and a device for the static alignment of shafts and for the monitoring of the shaft alignment are known from DE 33 35 336 A1.

SUMMARY OF THE INVENTION

It is the problem of the invention to specify a system and a method which enable a precise determination of the displacement of two bodies relative to each other.

This problem is solved according to the system and method of the present invention.

The system according to the invention comprises a first camera, a second camera, a first light, and a second light.

Both the first camera and also the second camera each comprise an objective lens and an image sensor having a sensor surface.

Both the first light and also the second light each comprise at least one light source and a lens device having positive refractive force for providing a divergent light bundle or a divergent illumination light or an illumination light by deflecting light emitted by the light source. The lens device having positive refractive force can have a collimator in particular.

Both the sensor surface of the image sensor of the first camera and also the sensor surface of the image sensor of the second camera have a coordinate system for the position detection of the virtual image on the sensor surface.

The system according to the invention for determining the displacement of two bodies relative to each other is distinguished in particular in that with each of the lights, the distance of the light source from the from the lens device or from the collimator of the lens device is less than the focal length of the lens device or the lens device of the collimator. It is thus possible to generate a virtual image of the light source of the respective light. The virtual image of the light source of the second light can now be imaged more sharply on the sensor surface of the first camera by the objective lens of the first camera, because it appears more remote.

And the virtual image of the light source of the first light can now be imaged more sharply on the sensor surface of the image sensor of the second camera by the objective lens of the second camera, because it appears more remote. In particular if the image distance of the virtual image is greater than the focal length of the objective lens.

Because the virtual images of the light sources of the lights can be imaged on the sensor surfaces by means of the system according to the invention, for example, on the basis of coordinates of the positions of the virtual images on the sensor surfaces, the displacement of the two bodies relative to one another can be determined very precisely. In this case, the coordinates—if in one embodiment of the bodies these are bodies which are each rotatable about a rotational axis—are the coordinates of the positions of the virtual images on the sensor surfaces, which are detected in at least five different rotational positions of at least one of the bodies or devices about the rotational axis or in at least three different rotational positions of each of the two bodies or devices about the rotational axis, wherein on the basis of these coordinates or on the basis of these coordinates and the rotational angles of these rotational positions, which are each dimensioned from a predefined reference rotational position of the first body and the second body, the displacement of the two bodies relative to one another can be determined very precisely. This is a result of the circumstance that because of the image distance of the respective virtual image, the absolute value of which can be significantly greater than the object distance depending on the selection of the object distance of the light source and the focal length of the lens device, a sufficiently high depth of field can be provided at a given distance between the respective light source and the objective lens of the camera.

The first camera is attachable to the first body of the two bodies and the second light is attachable to the second body of the two bodies such that a virtual image of the light source of the second light can be at least partially imaged on the sensor surface of the image sensor of the first camera by the objective lens of the first camera and/or the first camera is attachable to the first body of the two bodies and the second light is attachable to the second body of the two bodies, wherein in the attached state, a virtual image of the light source of the second light can be at least partially imaged on the sensor surface of the image sensor of the first camera by the objective lens of the first camera.

The second camera is attachable to the second body and the first light is attachable to the first body such that a virtual image of the light source of the first light can be at least partially imaged on the sensor surface of the image sensor of the second camera by the objective lens of the second camera and/or the second camera is attachable to the second body of the two bodies and the first light is attachable to the first body of the two bodies, wherein in the attached state, a virtual image of the light source of the first light can be at least partially imaged on the sensor surface of the image sensor of the second camera by the objective lens of the second camera.

When reference is made to different rotational positions of one of the bodies, this is obviously to be understood to mean that the rotational positions differ from one another by way of the rotational angle which is dimensioned from a predefined reference rotational position of this body.

Of course, the bodies do not necessarily have to be bodies which are rotatable about a rotational axis.

Even if, for example, as a result of structural conditions, a specific distance cannot be exceeded between the objective lens of the camera and the light source or the light, however, a high depth of field can be implemented by means of a large image distance of the virtual image for the imaging thereof on the respective sensor surface, since the depth of field increases with increasing distance of the respective virtual image from the objective lens of the camera, if the camera is focused at large distances. This high depth of field advantageously enables precise and/or sharp imaging of the virtual image of the respective light source on the respective sensor surface, which in turn enables very accurate detection of the coordinates of the virtual image of the respective light source on the respective sensor surface. In particular, the high depth of field is accompanied by the advantage that an adjustment of the focusing of the camera induced, for example, as a result of mechanical dislocation or wobbling does not have to have a substantial or noticeable influence on the accuracy in the determination of the displacement of the two bodies relative to each other, specifically entirely in contrast to the solution known from WO 2010/042039 A1, in which an adjustment of the focusing of the respective camera can result in large and/or substantial inaccuracies in the determination of the displacement of the bodies in relation to one another. In the solution known from WO 2010/042039 A1, the location of the rotational axes relative to one another is determined on the basis of the positions of the geometrical patterns on the sensor surfaces of the camera image sensors, specifically on the basis of the positions of these patterns in multiple rotational positions of the rotatable bodies, in particular shafts.

Considered as a whole, a precise determination of the displacement of two bodies relative to each other is possible using the system according to the invention on the basis of the above description.

The camera principle provided by the system according to the invention is distinguished in that the measuring range is greater than that of the sensors or the respective image sensor.

The first body is preferably a rotatable body which is rotatable about a rotational axis of the first body, and the second body is preferably a rotatable body which is rotatable about a rotational axis of the second body.

The first camera is preferably attachable in a rotationally-fixed manner to the first body such that the sensor surface of the image sensor or the flat sensor surface of the image sensor of the first camera is aligned perpendicularly or substantially perpendicularly in relation to the rotational axis of the first body. The second camera is also preferably attachable in a rotationally-fixed manner to the second body such that the sensor surface of the image sensor or the flat sensor surface of the image sensor of the second camera is aligned perpendicularly or substantially perpendicularly in relation to the rotational axis of the second body. This is preferably accordingly also provided for the main plane or main planes of the lens devices of the lights.

The image sensors of the camera can be arbitrary image sensors. In particular, each image sensor is preferably configured to detect and output the coordinates of the position of the virtual image of the respective light source or light-emitting light source. These coordinates can preferably be transmitted, for example, in the form of analog or digital signals via a signal transmission path—also wirelessly—from the respective image sensor to an analysis unit for analysis. The analysis unit or analysis device can be, for example, a computer, for example, in the form of a laptop or a tablet. Alternatively, the analysis unit can also be configured to detect or detect and output the coordinates of the position of the virtual image of the respective light source or light-emitting light source, wherein the analysis unit can receive data and/or signals of the respective image sensor via a data transmission path or signal transmission path from the respective image sensor for this purpose.

The image sensor can be in particular a PSD sensor (PSD is an abbreviation for "position sensitive device").

Each of the light sources of the two lights can comprise one or more light-emitting diodes or each of the light sources of the two lights can be designed in the form of a light-emitting diode, wherein the light-emitting diode can particularly advantageously be a light-emitting diode which can emit light through a very small aperture opening having a diameter within a range of 25 µm to 150 µm, so that a virtual image of the light source having only a very small extension can be provided on the respective sensor surface, with which a reference point for the position detection can advantageously be associated without significant computer effort.

If the first body is a rotatable body, which is rotatable about a rotational axis of the first body, and if the second body is a rotatable body, which is rotatable about a rotational axis of the second body, in one preferred embodiment, each coordinate system is a two-dimensional coordinate system and the system according to the invention comprises an analysis unit, which is configured to determine or define the displacement of the two bodies relative to each other on the basis of and/or by means of the coordinates of the positions of the virtual images on the sensor surfaces, which were detected in at least five different rotational positions of at least one of the bodies about the rotational axis or about the rotational axis of the body or in at least three different rotational positions of each of the two bodies about the rotational axis. For this purpose, the analysis unit is preferably connected via a signal transmission path and/or data transmission path to the respective image sensor or is part of the image sensor—for example, in the form of a programmable electronic component—wherein in the first case, the coordinates of the positions of the virtual image of the respective light source or light-emitting light source can be detected by the respective image sensor and supplied to the analysis unit via the signal transmission path and/or data transmission path, for example, in the form of analog or digital signals—also wirelessly—or output thereto. The analysis unit or analysis device can be, for example, a computer, for example, in the form of a laptop or a tablet, to which the coordinates of the position of the virtual image on the respective sensor surface can be supplied—in particular via a suitable interface. In this preferred embodiment, the coordinate system of each sensor surface or each image sensor is a two-dimensional coordinate system which thus specifies or detects positions of the respective virtual image using two coordinate values or coordinates (i.e., for example, X value and Y value in the case of a Cartesian coordinate system). The rotational angles or rotational angle values of the respective rotational positions are then not necessary for detecting the locations of the rotational axes relative to each other.

Alternatively, instead of the image sensor, the analysis unit can be configured to detect or detect and output the coordinates of the position of the virtual image of the respective light source or light-emitting light source, wherein the analysis unit can receive data and/or signals of the respective image sensor for this purpose via a data transmission path and/or signal transmission path from the respective image sensor.

If the first body is a rotatable body, which is rotatable about a rotational axis of the first body, and if the second body is a rotatable body, which is rotatable about a rotational axis of the second body, in a further advantageous embodiment, the system comprises an analysis unit, which is configured to determine the displacement of the two bodies relative to each other on the basis of the coordinates of the positions of the virtual images on the sensor surfaces, which were detected in at least five different rotational positions of at least one of the bodies about the rotational axis or in at least three different rotational positions of each of the two bodies about the rotational axis, and on the basis of the rotational angles of these rotational positions. In contrast to the above preferred embodiment, in this further advantageous embodiment, the coordinate system does not necessarily have to be a two-dimensional coordinate system, since in addition to the coordinates of the positions of the virtual images, the rotational angles of the rotational positions or the rotational angle values of these rotational positions can also be used for the location determination of the rotational axes or for the determination of the displacement of the bodies relative to each other, so that a one-dimensional coordinate system is also sufficient.

The analysis unit is also preferably connected via a signal transmission path and/or data transmission path to the respective image sensor or is part of the image sensor—for example, in the form of a programmable electronic component—in the above further advantageous embodiment, wherein in the first case, the coordinates of the positions of the virtual image of the respective light source or light-emitting light source can be detected by the respective image sensor and supplied to the analysis unit via the signal transmission path, for example, in the form of analog or digital signals—also wirelessly or output thereto. The analysis unit or analysis device can be, for example, a computer, for example, in the form of a tablet or laptop, to which the coordinates of the position of the virtual image on the respective sensor surface can be supplied—in particular via a suitable interface. Alternatively, instead of the image sensor, the analysis unit can also be configured here for the purpose of detecting or detecting and outputting the coordinates of the position of the virtual image of the respective light source or light-emitting light source, wherein the analysis unit can receive for this purpose corresponding or suitable data and/or signals of the respective image sensor via a data transmission path or signal transmission path, respectively, from the respective image sensor.

The rotational angles of the rotational positions or the rotational angle values of these rotational positions are each dimensioned from a reference rotational position of the respective body, i.e., a rotational angle or rotational angle value of the first body is dimensioned from a reference rotational position of the first body and a rotational angle or rotational angle value of a rotational position of the second body is dimensioned from a reference rotational position of the second body.

In one practical embodiment, each image sensor comprises a line sensor, wherein the sensor surface of each line sensor has a one-dimensional coordinate system having a coordinate axis parallel to the longitudinal axis of the line sensor, wherein both the first camera and also the second camera has an astigmatism or wherein both the objective lens of the first camera and also the objective lens of the second camera has an astigmatism, which can generate a virtual image of the respective light source having at least one focal line, wherein a section of the focal line, which is oriented at an angle, preferably perpendicularly to the coordinate axis, can be imaged on each sensor surface.

The astigmatism can be installed in each camera in particular.

The analysis unit is preferably configured to use the respective coordinates of the imaged section of the focal line in the one-dimensional coordinate system to determine the displacement of the bodies relative to each other as coordinates.

If the first body is a rotatable body which is rotatable about a rotational axis of the first body and if the second body is a rotatable body which is rotatable about a rotational axis of the second body, this practical embodiment can advantageously make use of the circumstance that, for determining the displacement of the two bodies relative to each other, the coordinate value or the coordinate of a single coordinate axis—i.e., the coordinate axis of the one-dimensional coordinate system—is sufficient, if for the determination of the displacement of the two bodies relative to each other, in addition to the coordinates of the positions of the virtual images in the one-dimensional coordinate system, the rotational angles or rotational angle values of the different rotational positions can also be used (cf. also the statements on the above advantageous embodiment). Therefore, a cost-effective system can be provided by means of image sensors—which each only comprise a cost-effectively obtainable line sensor—in conjunction with the astigmatism of each camera. In this practical embodiment, for determining the displacement of the two bodies relative to each other, in addition to the rotational angles of the rotational positions, only the coordinates of the imaged section of the respective focal lines on the respective sensor surface, which are detected in the rotational positions, are necessary. Of course, this presumes that the system is attachable in a rotationally-fixed manner to the first and second bodies such that a section of the respective focal line can be imaged on each of the sensor surfaces in each of the different rotational positions.

The longitudinal axes of the two line sensors are particularly preferably aligned in parallel to one another, so that the coordinate axis of the sensor surface of the line sensor of the first camera is thus aligned or oriented in parallel to the coordinate axis of the sensor surface of the line sensor of the second camera. Due to this parallel alignment, the coordinates of the first and second cameras are advantageously directly comparable to one another, and without having to perform complex conversions.

The image distance of the virtual image of the light source of the first and also the second light—wherein the virtual images are generated by the lens device of the first or second light, respectively—is preferably within a range of −400 mm to −100 mm. With such a large image distance in absolute value, which can be implemented by suitable selection of the object distance of the light source and the focal length of the lens device, a very high depth of field can advantageously be provided at a given distance between the respective light source and the objective lens of the camera, which enables a very precise determination or measurement of the displacement of the two bodies relative to each other, even if, for example, as a result of structural conditions, a certain distance between the objective lens of the respective camera and the respective light source or light cannot be exceeded. A typical image distance selected in practice is −350 mm.

The method according to the invention for determining the displacement of two bodies relative to each other, wherein each body is rotatable about a rotational axis, comprises the following steps:

(A) providing a system according to the invention, wherein the first camera is attachable in a rotationally-fixed manner to the first body and the second light is attachable in a rotationally-fixed manner to the second body, wherein the second camera is attachable in a rotationally-fixed manner to the second body and the first light is attachable in a rotationally-fixed manner to the first body, (B) rotationally-fixed attachment of the first camera to the first body and the second light to the second body, wherein the first camera and the second light are attached in a rotationally-fixed manner such that a virtual image of the light source of the second light can be imaged on the sensor surface of the image sensor of the first camera at least partially or in its entirety by the objective lens of the first camera, and (C) rotationally-fixed attachment of the second camera to the second body and the first light to the first body, wherein the second camera and the first light are attached in a rotationally-fixed manner such that a virtual image of the light source of the first light can be imaged on the sensor surface of the image sensor of the second camera at least partially or in its entirety by the objective lens of the second camera, (D) activating both the first and also the second light, (E) detecting the coordinates of the positions of the virtual images of the light sources of the lights on the sensor surfaces in at least five different rotational positions of at least one body about the rotational axis or in at least three different rotational positions of each of the two bodies about the rotational axis, and (F) determining the displacement of the two bodies relative to each other on the basis of the coordinates detected in step (E) or on the basis of the coordinates detected in step (E) and on the basis of the rotational angles or rotational angle values of the rotational positions (cf. in this regard also the corresponding statements above in the preferred embodiment and the further advantageous embodiment).

A precise determination of the displacement of the two bodies relative to each other can be implemented by the method according to the invention, which can be carried out by means of the system according to the invention, for the reasons already described above with reference to the system according to the invention.

Of course, there is no binding to a chronological sequence by naming the steps A to F. The letters are merely used for naming or giving names to the steps. Thus, steps B and C are carried out after step A, wherein, however, step B can be carried out after step C or step C can be carried out after step B. In particular, steps B and C can also be carried out simultaneously as a whole or temporarily or during at least one time interval.

The activation or turning on of the lights according to step D, which has the result that the light sources of the lights are turned on or activated and emit light, is preferably performed after steps A, B, and C. Step E occurs after step D to ensure that the virtual images of the light sources are images of illuminated light sources or light-emitting light sources, the coordinates of which can be detected very precisely in step F. In step F, which preferably occurs after step E, but can also possibly begin or start already during the detection of the coordinates according to step E, the determination of the displacement of the two bodies relative to each other is performed.

Of course, step E presumes that in each rotational position, a virtual image of the light source of the first light can be imaged at least partially or in its entirety on the sensor surface of the second camera and a virtual image of the light source of the second light can be imaged at least partially or in its entirety on the sensor surface of the first camera. If these conditions are met, the different rotational positions can otherwise freely selected, of course, and in particular can be advantageously adapted to structural conditions.

In one practical embodiment of the method according to the invention, in the system, each image sensor comprises a line sensor extending along a straight line, wherein the sensor surface of each line sensor has a one-dimensional coordinate system having a coordinate axis parallel to the longitudinal axis of the line sensor, wherein both the first camera and also the second camera has an astigmatism, which can generate a virtual image of the respective light source having at least one focal line, wherein a section of the focal line, which is oriented at an angle, preferably perpendicularly to the coordinate axis, can be imaged on each sensor surface wherein in step (E), the coordinates of the positions of the virtual images in the one-dimensional coordinate system determined by the imaged section of the focal line are detected, and wherein in step (F), the displacement of the two bodies relative to each other is determined on the basis of these coordinates and on the basis of the rotational angles of the rotational positions. As already described above in conjunction with the practical embodiment of the system according to the invention, by providing a cost-effectively available line sensor in conjunction with the provided astigmatism on the first or second camera or on the objective lens of the first and second camera, a cost-effective system can be provided and therefore also a method which can be carried out cost-effectively for determining the displacement of two bodies relative to each other.

The image distance of the virtual image of the light source of the first and also the second light—wherein the virtual images are generated by the lens device of the first or second light, respectively—is preferably within a range of −400 mm to −100 mm and/or a virtual image of the first light source is preferably generated by the lens device of the first light and a virtual image of the second light source is preferably generated by the lens device of the second light, which each have an image distance within a range of −400 mm to −100 mm, accompanied by the advantages already described above in conjunction with the system according to the invention.

Of course, in step E, the number of the provided different rotational positions are only minimum numbers. A significantly higher number of different rotational positions of the first and/or second body can preferably be provided, whereby the accuracy in the determination of the displacement of the two bodies relative to each other can advantageously be substantially increased. In particular, in step E, for example, the coordinates of the positions of the virtual images of the light sources of the lights on the sensor surfaces can advantageously be detected in at least 10, 20, or more different rotational positions of at least one body about the rotational axis or in at least 10, 20, or more different rotational positions of each of the two bodies about the rotational axis.

BRIEF DESCRIPTION OF THE DRAWINGS

Exemplary embodiments of the invention will be explained in greater detail hereafter on the basis of the appended drawings. In the figures.

DESCRIPTION OF THE INVENTION

Figure 1:
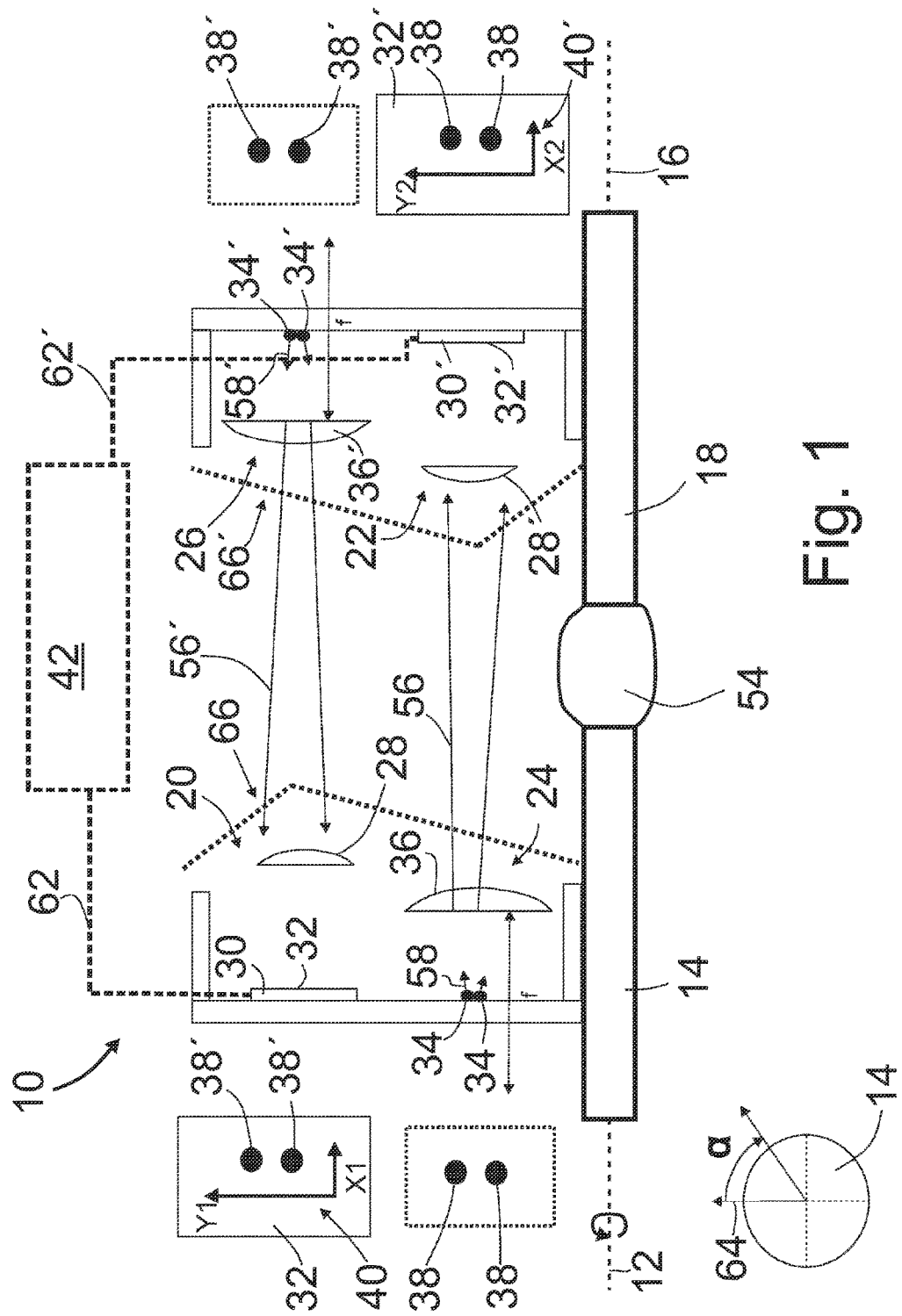
FIG. 1 shows a very schematic sectional illustration of a first exemplary embodiment of a system according to the invention together with two rotatable bodies, each in the form of a shaft.

The system 10 according to FIG. 1 is a system 10 for determining the displacement of two bodies 14, 18 relative to each other. The first body 14 is designed in the form of a shaft 14 or comprises a shaft 14. The second body 18 is also designed in the form of a shaft 18 or comprises a shaft 18.

The two shafts 14, 18 are connected to one another via a coupling 54, so that a rotation of the first shaft 14 is transmittable to the second shaft 18 and vice versa.

The system 10 comprises a first camera 20, a second camera 22, a first light 24, and a second light 26. The first camera 20 and the first light 24 are accommodated in a housing 66. The second camera 22 and the second light 26 are also accommodated in a housing 66'.

The first camera 20 comprises an objective lens 28 and an image sensor 30 having a sensor surface 32 and the second camera 22 comprises an objective lens 28' and an image sensor 30' having a sensor surface 32'.

The first light 24 comprises two light sources 34 and one lens device 36 having positive refractive force for providing a divergent illumination light 56 by deflecting light 58 emitted by the light sources 34.

The second light 26 comprises two light sources 34' and a lens device 36' having positive refractive force for providing a divergent illumination light 56' by deflecting light 58' emitted by the light sources 34'.

Each light source 34, 34' comprises a light-emitting diode for emitting light. Each lens device 36, 36' comprises a converging lens or is designed in the form of a converging lens. The diverging illumination light 56, 56' is respectively partially incident via an aperture (not shown here) of the respective camera 20, 22 and the respective objective lens 28, 28' on the respective sensor surface 32, 32'. A measuring region in the size of the respective light thus results in the vicinity, in the distance, a measuring region in the size of the widened beam or divergent illumination light 56, 56' results. The resolution is constant in relation to the size of the measuring range. Highly advantageous resolutions within a range of 0 to 10 m at close range and in the distance are possible by means of the system 10 according to the invention.

In each of the lights 24, 26, the distance of the light sources 34, 34' from the lens device 36, 36' is less than the focal length f of the lens device 36, 36', i.e., less than the distance of the focal point of the lens device 36, 36' from the lens device 36, 36'.

In the situation illustrated according to FIG. 1, the first camera 20 is fixedly attached to the first body 14 and the second light 26 is fixedly attached to the second body 18 such that virtual images 38' of the light sources 34' of the second light 26 can be imaged on the sensor surface 32 of the image sensor 30 of the first camera 20 by the objective lens 28 of the first camera 20. Furthermore, in the situation illustrated according to FIG. 1, the second camera 22 is fixedly attachable to the second body 18 and the first light 24 is fixedly attachable to the first body 14 such that virtual images 38 of the light sources 34 of the first light 24 can be imaged on the sensor surface 32' of the image sensor 30' of the second camera 22 by the objective lens 28' of the second camera 22.

In FIG. 1, the virtual images 38, 38' are shown pivoted by 90° in relation to the actual location thereof schematically in a top view on the left and right, respectively, wherein the illustration having the dashed rectangle schematically shows the position of the virtual images 38, 38' or the associated virtual plane in each case. The illustration having the solid rectangle, in contrast, very schematically illustrates the respective sensor surface 32, 32' in a top view, on which the respective virtual images 38, 38' are imaged or optically imaged.

Both the sensor surface 32 of the image sensor 30 of the first camera 20 and also the sensor surface 32' of the image sensor 30' of the second camera 22 have a two-dimensional Cartesian coordinate system 40 or 40', respectively, for the position detection of the virtual images 38 or 38' on the sensor surfaces 32 or 32', respectively. The two-dimensional Cartesian coordinate system 40 of the first camera 20 has an X1 coordinate axis and a Y1 coordinate axis perpendicular thereto. The two-dimensional Cartesian coordinate system 40' of the second camera 22 has an X2 coordinate axis and a Y2 coordinate axis perpendicular thereto.

The system 10 according to FIG. 1 furthermore has an analysis unit 42 (only shown very schematically), which comprises a computer (not shown in greater detail) and is connected to each image sensor 30 or 30' via a signal transmission path 62 or 62', respectively. The analysis unit 42 is configured, on the basis of the Y1 values and Y2 values or the Y1 coordinates and Y2 coordinates of the positions of the virtual images 38 or 38' on the sensor surfaces 32 or 32', respectively, which were detected in at least five different rotational positions of one of the two shafts 14, 18, which are connected to one another by the coupling 54, about the rotational axes 12, 16 of the shafts 14, 18, and on the basis of the rotational angles α or the rotational angle values of these rotational positions (cf. also the schematic top view of the first shaft 14, which illustrates the rotational angle α, which is dimensioned from a predefined reference rotational position 64), which have been measured by an inclinometer, for example, to determine the displacement of the two shafts 14, 18 relative to each other and to determine therefrom in particular a possible deviation from a non-flush alignment (not shown in the very schematic illustration of FIG. 1) of the two shafts 14, 18. Since the rotational angles are also used for determining the rotational axis position in this analysis unit 42, the X1 coordinates and X2 coordinates do not play a role or are not required for determining the displacement.

In a method for determining the displacement of the two shafts 14, 18 relative to each other, the following steps are provided:

(A) providing the system 10 according to FIG. 1, (B) rotationally-fixed attachment of the first camera 20 to the first shaft 14 and the second light 26 to the second shaft 18, wherein the first camera 20 and the second light 26 are attached in a rotationally-fixed manner such that virtual images 38' of the light sources 34' of the second light 26 on the sensor surface 32 of the image sensor 30 of the first camera 20 can be imaged by the objective lens 28 of the first camera 20, and (C) rotationally-fixed attachment of the second camera 22 to the second shaft 18 and the first light 24 to the first body 14, wherein the second camera 22 and the first light 24 are attached in a rotationally-fixed manner such that virtual images 38 of the light sources 34 of the first light 24 can be imaged on the sensor surface 32' of the image sensor 30' of the second camera 22 by the objective lens 28' of the second camera 22, (D) activating both the first and also the second light 24, 26, (E) detecting the coordinates of the positions of the virtual images 38, 38' of the light sources 34, 34' of the lights 24, 26 on the sensor surfaces 32, 32', and (F) determining the displacement of the two shafts (14, 18) relative to each other.

Figure 2:
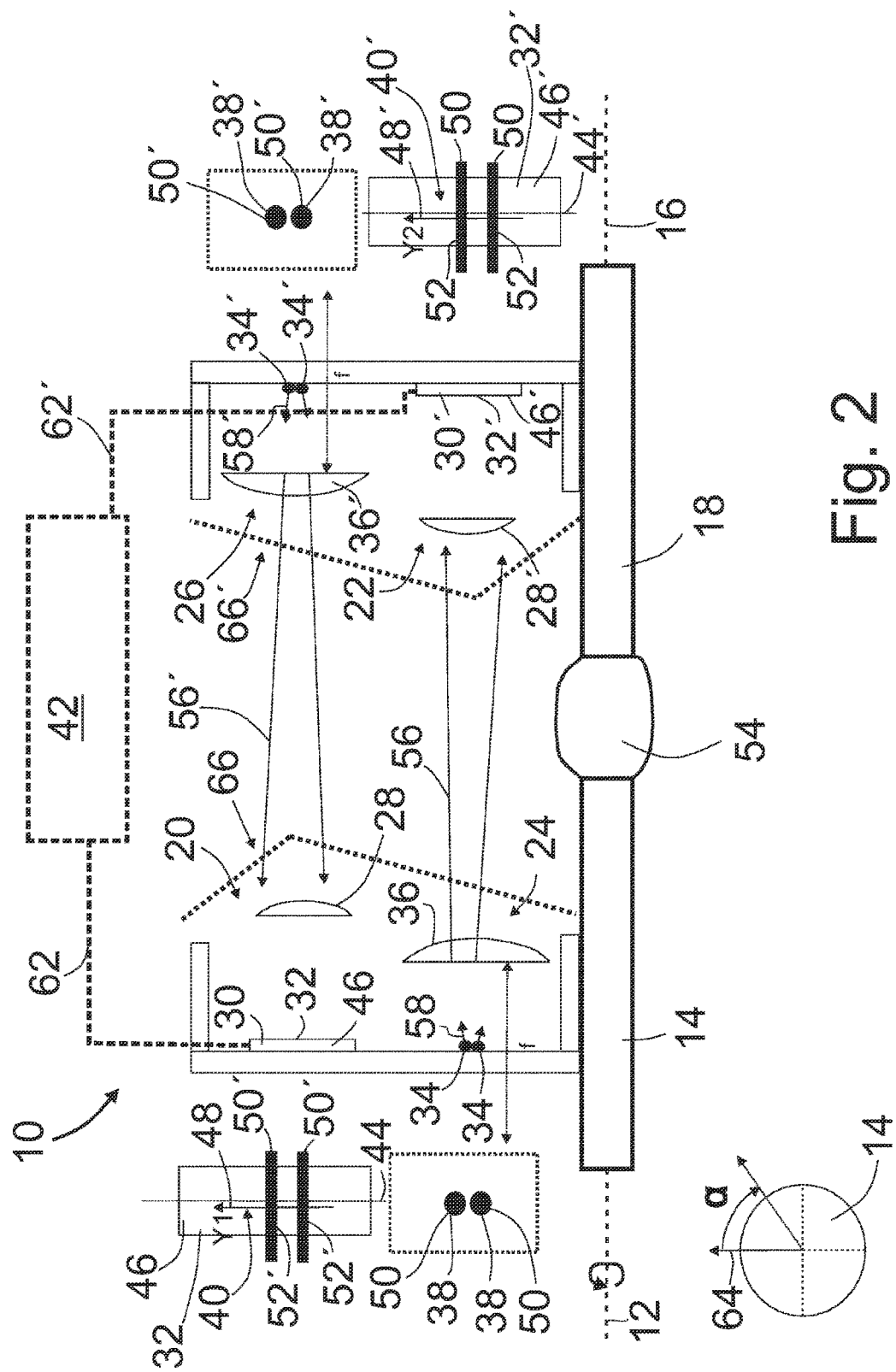
FIG. 2 shows a very schematic sectional illustration of a second exemplary embodiment of a system according to the invention together with the two rotatable bodies each in the form of a shaft according to FIG. 1.

The system 10 according to FIG. 2 differs from the system according to FIG. 1 in that each image sensor 30, 30' comprises a line sensor 46, 46', wherein the sensor surface 32, 32' of each line sensor 46, 46' has a one-dimensional coordinate system 40, 40' having a coordinate axis 48, 48' (Y1 coordinate axis and Y2 coordinate axis here) parallel to the longitudinal axis 44, 44' of the line sensor 46, 46'. Furthermore, in the system 10 according to FIG. 2, both the objective lens 28 of the first camera 20 and also the objective lens 28' of the second camera 22 have an astigmatism, which can generate a virtual image 38 or 38' of the respective light source 34, 34' in the form of a disk-shaped or circular-disk-shaped or nearly punctiform light spot 50 or 50', respectively. A section 52, 52' of the focal line 50, 50', which is oriented in each case perpendicularly to each of the coordinate axes 48, 48' parallel to one another, can be imaged on each sensor surface 32, 32'. The analysis unit 42 of the system 10 according to FIG. 2 is configured to use the Y1 coordinates and Y2 coordinates of the imaged sections 52, 52' of the focal lines 50, 50' in the different rotational positions as the coordinates for determining the location of the rotational axes 12, 16 in relation to one another.

In a method for determining the displacement of the two shafts 14, 18 relative to each other according to the above steps by means of the system according to FIG. 2, in step E, the Y1 coordinates and Y2 coordinates of the positions of the virtual images 38, 38' of the light sources 34, 34' determined by the imaged section 52, 52' of the focal line 50, 50' are detected, i.e, the Y1 coordinates and Y2 coordinates of the sections 52, 52'.

The invention claimed is:

1. A system for determining the displacement of two bodies relative to each other, comprising:
    a first camera, a second camera, a first light, and a second light,
    wherein both the first camera and also the second camera each comprise an objective lens and an image sensor having a sensor surface,
    wherein both the first light and also the second light each comprise at least one light source and a lens device having positive refractive force for providing an illumination light by deflecting light emitted by the light source,
    wherein in each of the lights, the distance of the light source from the lens device is less than the focal length of the lens device,
    wherein the first camera is attachable to a first body of the two bodies and the second light is attachable to the second body of the two bodies such that a virtual image of the light source of the second light can be at least partially imaged on the sensor surface of the image sensor of the first camera by the objective lens of the first camera,
    wherein the second camera is attachable to the second body and the first light is attachable to the first body such that a virtual image of the light source of the first light can be at least partially imaged on the sensor surface of the image sensor of the second camera by the objective lens of the second camera,
    wherein the sensor surface of the image sensor of the first camera and also the sensor surface of the image sensor of the second camera have a coordinate system for the position detection of the virtual image on the sensor surface.

2. The system as claimed in claim 1, wherein the first body is a rotatable body, which is rotatable about a rotational axis of the first body, and the second body is a rotatable body, which is rotatable about a rotational axis of the second body, wherein each coordinate system is a two-dimensional coordinate system, and the system comprises an analysis unit, which is configured to determine the displacement of the two bodies relative to each other on the basis of the coordinates of the positions of the virtual images on the sensor surfaces, which were detected in at least five different rotational positions of at least one of the bodies about the rotational axis or in at least three different rotational positions of each of the two bodies about the rotational axis.

3. The system as claimed in claim 1, wherein the first body is a rotatable body, which is rotatable about a rotational axis of the first body, and the second body is a rotatable body, which is rotatable about a rotational axis of the second body, wherein the system comprises an analysis unit, which is configured to determine the displacement of the two bodies relative to each other on the basis of the coordinates of the positions of the virtual images on the sensor surfaces, which were detected in at least five different rotational positions of at least one of the bodies about the rotational axis or in at least three different rotational positions of each of the two bodies about the rotational axis, and on the basis of the rotational angles of these rotational positions.

4. The system as claimed in claim 1, wherein each image sensor comprises a line sensor, wherein the sensor surface of each line sensor has a one-dimensional coordinate system having a coordinate axis parallel to the longitudinal axis of the line sensor,
    wherein both the first camera and also the second camera has an astigmatism, which can generate a virtual image of the respective light source having at least one focal line, wherein a section of the focal line, which is oriented at an angle to the coordinate axis, can be imaged on each sensor surface.

5. The system as claimed in claim 3, wherein the analysis unit is configured to use the coordinates of the imaged section of the focal line in the one-dimensional coordinate system to determine the displacement of the bodies relative to each other as coordinates.

6. The system as claimed in claim 1, wherein the image distance of the virtual image of the light source of the first and also the second light is within a range of −400 mm to −100 mm.

7. A method for determining the displacement of two bodies relative to each other, wherein each body is rotatable about a rotational axis, comprising the steps of:
    providing a system as claimed in claim 1, wherein the first camera is attachable in a rotationally-fixed manner to the first body and the second light is attachable in a rotationally-fixed manner to the second body, wherein the second camera is attachable in a rotationally-fixed manner to the second body and the first light is attachable in a rotationally-fixed manner to the first body, rotationally-fixed attachment of the first camera to the first body and the second light to the second body, wherein the first camera and the second light are attached in a rotationally-fixed manner such that a virtual image of the light source of the second light can be imaged on the sensor surface of the image sensor of the first camera at least partially by the objective lens of the first camera, and rotationally-fixed attachment of the second camera to the second body and the first light to the first body, wherein the second camera and the first light are attached in a rotationally-fixed manner such that a virtual image of the light source of the first light can be imaged on the sensor surface of the image sensor of the second camera at least partially by the objective lens of the second camera, activating both the first and also the second light, detecting the coordinates of the positions of the virtual images of the light sources of the lights on the sensor surfaces in at least five different rotational positions of at least one body about the rotational axis or in at least three different rotational positions of each of the two bodies about the rotational axis, and determining the displacement of the two bodies relative to each other on the basis of the coordinates detected in step (E) or on the basis of the coordinates detected in step (E) and on the basis of the rotational angles of the rotational positions.

8. The method as claimed in claim 7, wherein the system, each image sensor comprises a line sensor, wherein the sensor surface of each line sensor has a one-dimensional coordinate system having a coordinate axis parallel to the longitudinal axis of the line sensor, wherein both the first camera and also the second camera has an astigmatism, which can generate a virtual image of the respective light source having at least one focal line, wherein a section of the focal line, which is oriented at an angle to the coordinate axis, can be imaged on each sensor surface, wherein in step (E), the coordinates of the positions of the virtual images in the one-dimensional coordinate system determined by the imaged section of the focal line are detected, and wherein in step (F), the displacement of the two bodies relative to each other is determined on the basis of these coordinates and on the basis of the rotational angles of the rotational positions.

9. The method as claimed in claim 7, wherein the image distance of the virtual image of the light source of the first and also the second light is within a range of −400 mm to −100 mm.

10. The system as claimed in claim 3, wherein each image sensor comprises a line sensor, wherein the sensor surface of each line sensor has a one-dimensional coordinate system having a coordinate axis parallel to the longitudinal axis of the line sensor, wherein both the first camera and also the second camera has an astigmatism, which can generate a virtual image of the respective light source having at least one focal line, wherein a section of the focal line, which is oriented at an angle to the coordinate axis, can be imaged on each sensor surface.

11. The system as claimed in claim 4, wherein the analysis unit is configured to use the coordinates of the imaged section of the focal line in the one-dimensional coordinate system to determine the displacement of the bodies relative to each other as coordinates.

12. The method as claimed in claim 8, wherein the image distance of the virtual image of the light source of the first and also the second light is within a range of −400 mm to −100 mm.

* * * * *